US011489959B2

(12) United States Patent
Narula et al.

(10) Patent No.: US 11,489,959 B2
(45) Date of Patent: Nov. 1, 2022

(54) MULTI-DEVICE CONTROL TRANSFER USING BLUETOOTH LE RANGING

(71) Applicant: Dell Products L.P., Round Rock, TX (US)

(72) Inventors: Harpreet S. Narula, Austin, TX (US); Liam B. Quinn, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 143 days.

(21) Appl. No.: 17/138,988

(22) Filed: Dec. 31, 2020

(65) Prior Publication Data
US 2022/0210263 A1    Jun. 30, 2022

(51) Int. Cl.
| H03M 1/72 | (2006.01) |
| H04M 1/72454 | (2021.01) |
| H04W 4/38 | (2018.01) |
| H04W 4/80 | (2018.01) |
| G06F 3/01 | (2006.01) |
| H01Q 1/22 | (2006.01) |
| H01Q 1/32 | (2006.01) |

(52) U.S. Cl.
CPC ........ *H04M 1/72454* (2021.01); *G06F 3/017* (2013.01); *H01Q 1/2291* (2013.01); *H01Q 1/3233* (2013.01); *H04W 4/38* (2018.02); *H04W 4/80* (2018.02)

(58) Field of Classification Search
CPC ..... H04M 1/72454; H04W 4/38; H04W 4/80; G06F 3/017; H01Q 1/2291; H01Q 1/3233
See application file for complete search history.

(56) References Cited

U.S. PATENT DOCUMENTS

| 2012/0290657 A1 | 11/2012 | Parks et al. |
| 2014/0032706 A1 | 1/2014 | Kuscher et al. |
| 2014/0141714 A1 | 5/2014 | Ghosh et al. |

OTHER PUBLICATIONS

International Search Report and Written Opinion for PCT Application No. PCT/US2021/029807, dated Sep. 17, 2021.

*Primary Examiner* — Curtis B Odom
(74) *Attorney, Agent, or Firm* — Terrile, Cannatti & Chambers; Stephen A. Terrile

(57) ABSTRACT

A system, method, and computer-readable medium are disclosed for performing a control transfer operation. The control transfer operation includes: using a Bluetooth compatible phase based ranging to detect proximity between a first device and a second device, the first device executing a first application, the first application having an associated first application context; detecting a change in proximity between the first device and the second device via the phase based ranging; providing a notification to a user on the second device when the change in proximity is detected, the notification querying the user regarding whether to transfer operation of the first application from the first device to the second device; and, automatically providing the first application context to the second device based upon the querying.

20 Claims, 7 Drawing Sheets

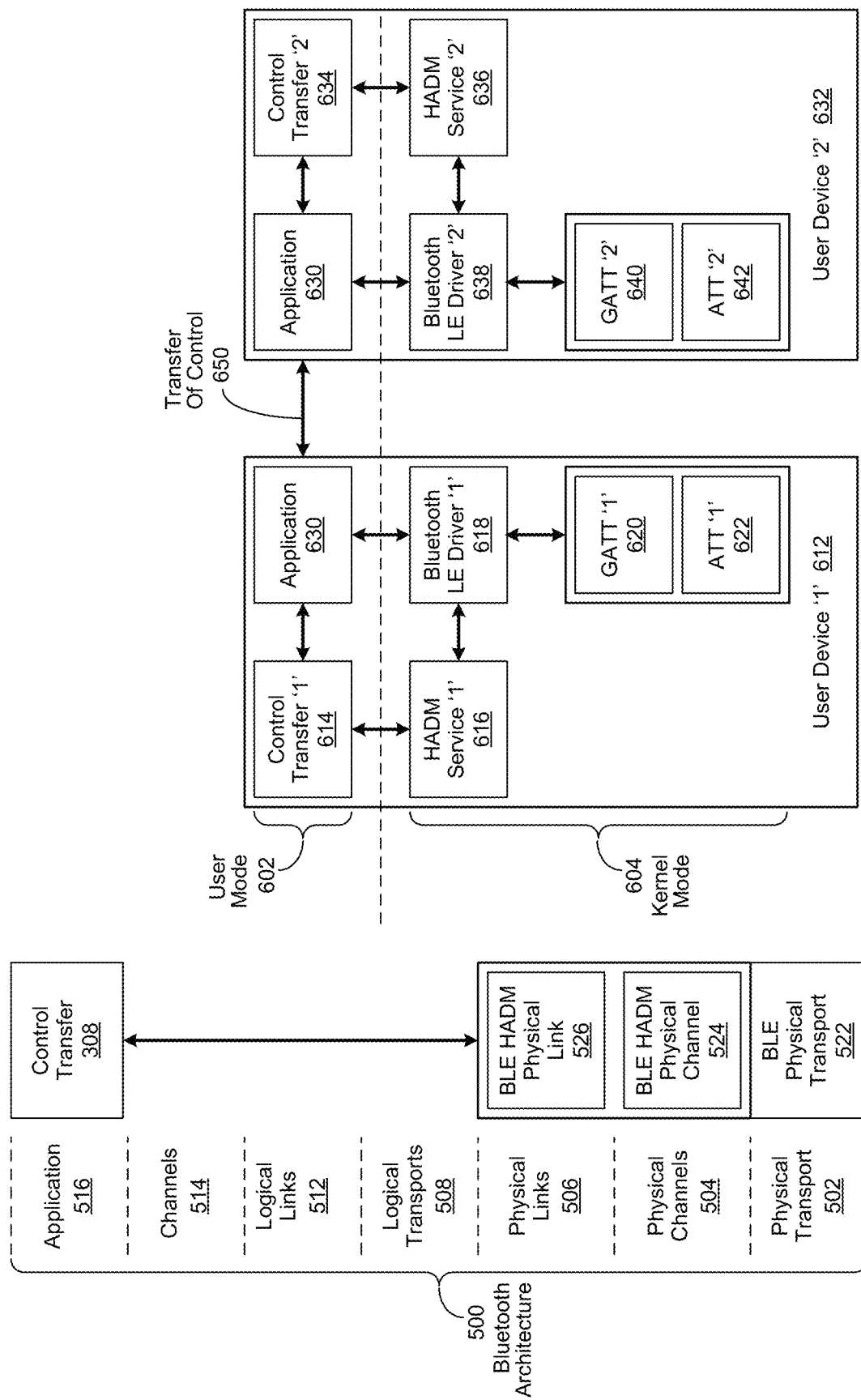

MULTI-DEVICE CONTROL TRANSFER USING BLUETOOTH LE RANGING

BACKGROUND OF THE INVENTION

Field of the Invention

The present invention relates to information handling systems. More specifically, embodiments of the invention relate to performing a control transfer operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a control transfer operation, comprising: using a Bluetooth compatible phase based ranging to detect proximity between a first device and a second device, the first device executing a first application, the first application having an associated first application context; detecting a change in proximity between the first device and the second device via the phase based ranging; providing a notification to a user on the second device when the change in proximity is detected, the notification querying the user regarding whether to transfer operation of the first application from the first device to the second device; and, automatically providing the first application context to the second device based upon the querying.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: using a Bluetooth compatible phase based ranging to detect proximity between a first device and a second device, the first device executing a first application, the first application having an associated first application context; detecting a change in proximity between the first device and the second device via the phase based ranging; providing a notification to a user on the second device when the change in proximity is detected, the notification querying the user regarding whether to transfer operation of the first application from the first device to the second device; and, automatically providing the first application context to the second device based upon the querying.

In another embodiment the invention relates to a computer-readable storage medium embodying computer program code, the computer program code comprising computer executable instructions configured for: using a Bluetooth compatible phase based ranging to detect proximity between a first device and a second device, the first device executing a first application, the first application having an associated first application context; detecting a change in proximity between the first device and the second device via the phase based ranging; providing a notification to a user on the second device when the change in proximity is detected, the notification querying the user regarding whether to transfer operation of the first application from the first device to the second device; and, automatically providing the first application context to the second device based upon the querying.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 5 show integration of Bluetooth Low Energy (LE) High Accuracy Distance Measurement (HADM) physical links and channels into a Bluetooth protocol architecture;

FIG. 6 shows modes of operation used in the performance of a control transfer operation;

DETAILED DESCRIPTION

Figure 1:
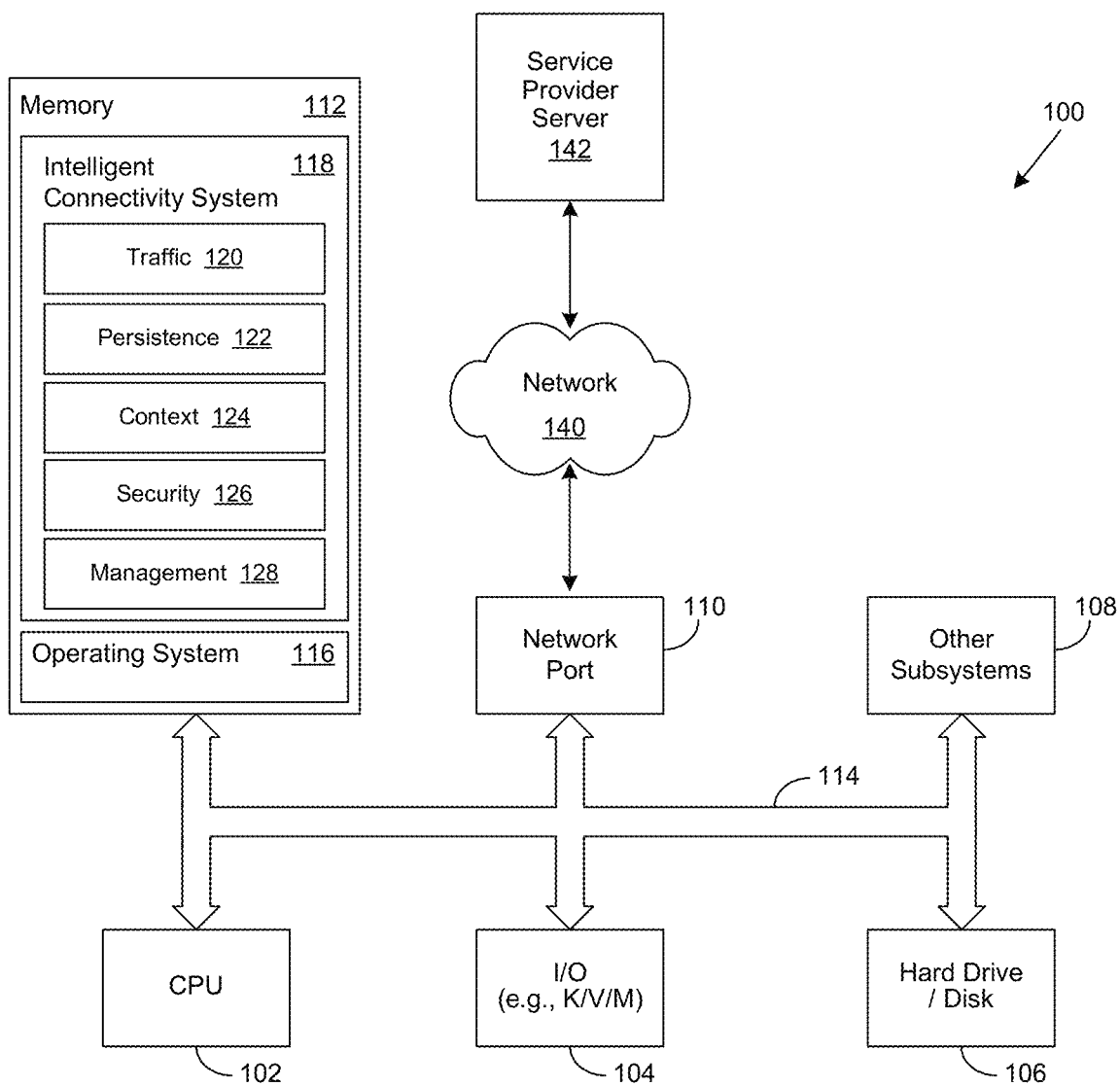
FIG. 1 shows a general illustration of components of an information handling system as implemented in the system and method of the present invention.

A system, method, and computer-readable medium are disclosed for performing a control transfer operation. Certain aspects of the invention reflect an appreciation that there is an increasing need to efficiently get data from where it may be stored or generated to where it is needed, whether that be in a data center, in the cloud, on the network edge, or a combination thereof. Certain aspects of the invention likewise reflect an appreciation that there is a growing proliferation of network-enabled devices (i.e., devices that can connect to a network through a network link) and network connectivity options. These network connectivity options include Personal Area Networks (PANs), such as Bluetooth, Wireless Local Area Networks (WLANs), such as Wireless Fidelity (WiFi) networks, Wireless Wide Area Networks (WWANs), such as 3G, 4G, and 5G cellular networks, satellite networks, and wired networks, such as traditional LANs, and Wide Area Networks (WANs), such as the Internet.

Certain aspects of the invention reflect an appreciation that today's network-enabled productivity, collaboration, work, and entertainment activities are increasingly occurring anywhere and at any time. Likewise, certain aspects of the invention reflect an appreciation that such activities are becoming a part of everyday life, and as a result, are leading to an increased expectation of network connectivity wherever and whenever needed. Certain aspects of the invention reflect an appreciation that users have likewise come to expect network connectivity, regardless of the underlying technology used to provide it, to be seamless, reliable, and secure.

Various aspects of the invention reflect an appreciation that users are increasingly using more than one user device when engaged in certain network-enabled activities. Certain aspects of the invention likewise reflect an appreciation that it is not uncommon for a user to use one user device, such as a laptop computer, to begin a network-enabled activity, only to switch to another user device, such as a smartphone, at some point in time to continue the activity. As an example, a salesperson may work out of their home office and normally use their laptop computer to participate in a weekly sales meeting via videoconference.

In this example, the salesperson may only be able to participate for the first half hour of the videoconference, as they need to travel to a customer site to make a previously-scheduled sales presentation. To continue the example, the salesperson may sign off of the videoconference, and then use their smartphone to dial back into the video conference so they can continue to participate while they travel to the customer's site. Certain aspects of the invention reflect that while such a transfer from one user device to another may be common, the process involved is typically not transparent, nor seamless, and as a result, results in a disruptive user experience.

Various aspects of the invention likewise reflect an appreciation that certain known Wireless Fidelity (WiFi) and Bluetooth proximity detection approaches, such as Received Signal Strength Indicator (RSSI), are generally not able to provide an accurate measurement of the distance separating two network-enabled devices that are proximate to one another. Certain aspects of the invention likewise reflect an appreciation that other wireless proximity determination approaches, such as Near Field Communication (NFC) and Ultra Wideband (UWB) require accurate location of their antennas within a user device, thereby adding additional complexities. Likewise, various aspects of the invention reflect an appreciation that certain of these proximity determination approaches may be limited to one-way traffic, or not available for implementation with certain operating systems. Furthermore, in the case of an APPLE® SMARTPHONE®, NFC is currently dedicated for use in conducting secure payments, and is not allowed to be used to transfer any other kind of data.

Likewise, various aspects of the invention reflect an appreciation that certain approaches outlined in the Bluetooth 6 specification, planned for adoption in 2021, enable phase-based accurate ranging. As used herein, ranging broadly refers to determining the distance between two network-enabled devices, such as a user device, a router, an access point, and so forth, that are proximate to one another. In various embodiments, certain radio frequency (RF) phase-based ranging approaches familiar to skilled practitioners of the art may be implemented to achieve such ranging. Those of skill in the art will likewise be aware that one such example of a phase-based ranging approach is High Accuracy Distance Measurement (HADM), described in the Bluetooth 6 specification, which as defined, is targeted to achieve an accuracy of less than 20 centimeters. Accordingly, certain aspects of the invention reflect an appreciation that the use of HADM would be advantageous when attempting to accurately determine the distance of separating two network-enabled user devices that are proximate to one another.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise an intelligent connectivity system 118. In one embodiment, the information handling system 100 is able to download the intelligent connectivity system 118 from the service provider server 142. In another embodiment, the intelligent connectivity system 118 is provided as a service from the service provider server 142.

In certain embodiments, the intelligent connectivity system 118 may be implemented to include a traffic component 120, a persistence component 122, a context component 124, a security component 126, and a management component 128, or a combination thereof, as described in greater detail herein. In certain embodiments, the intelligent connectivity system 118 may be implemented to perform an intelligent connectivity operation, described in greater detail herein. In certain embodiments, the intelligent connectivity operation may be performed by the intelligent connectivity system 118 during operation of an information handling system 100. In certain embodiments, the performance of the intelligent connectivity operation may result in the realization of improved network connectivity for the information handling system 100.

Figure 2:
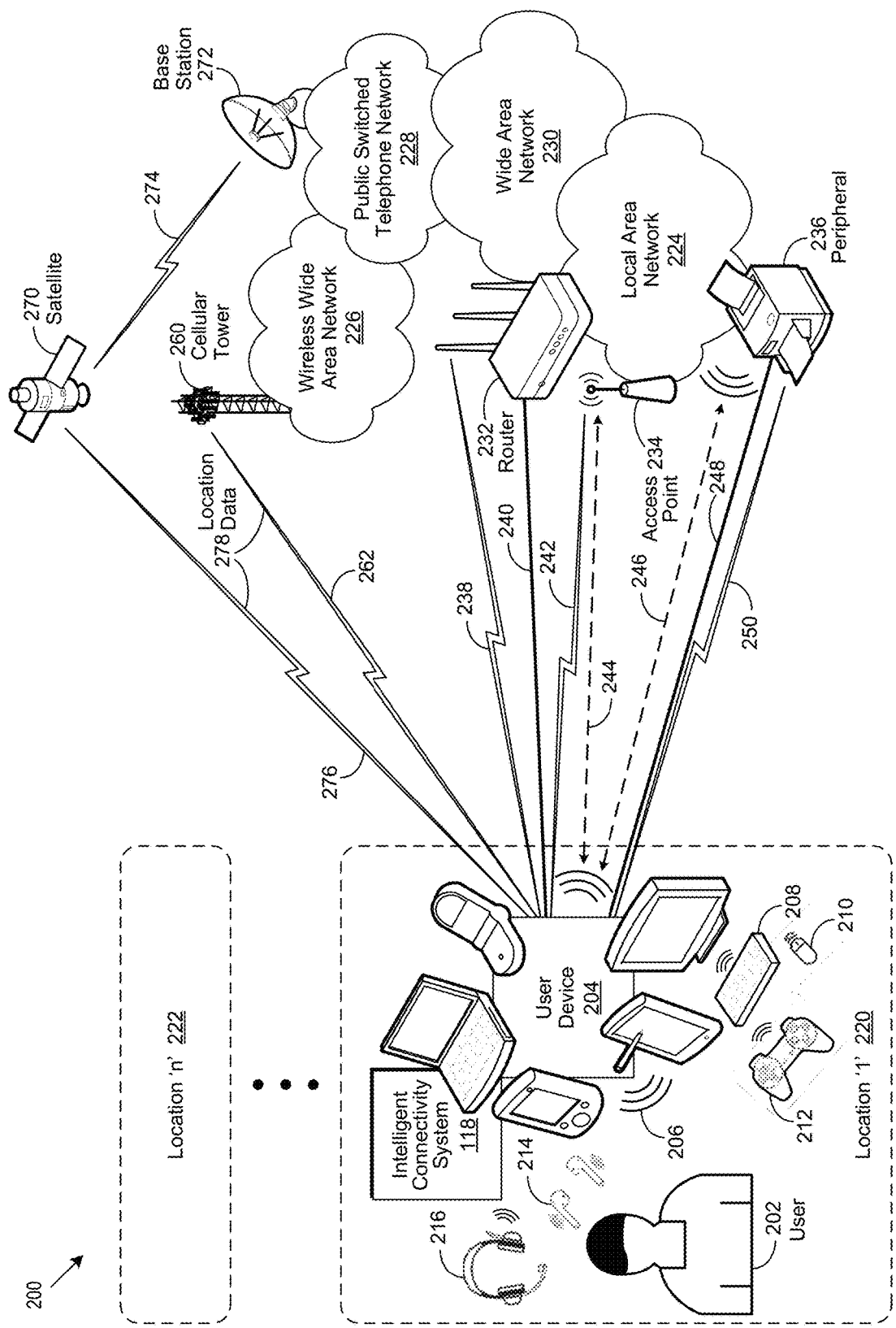
FIG. 2 is a block diagram of an intelligent connectivity environment.

FIG. 2 is a block diagram of an intelligent connectivity environment implemented in accordance with an embodiment of the invention. In certain embodiments, the intelligent connectivity environment 200 may include an intelligent connectivity system 118, described in greater detail herein. In certain embodiments, the intelligent connectivity system 118 may be implemented on a user device 204. As used herein, a user device 204 broadly refers to an information handling system such as a personal computer, a laptop computer, a tablet computer, a personal digital assistant (PDA), a smart phone, a mobile telephone, or other device that is capable of communicating and processing data. In certain embodiments, a user 202 may use the user device 204 to interact with the intelligent connectivity system 118.

In certain embodiments, the intelligent connectivity environment 200 may include a Local Area Network (LAN) 224, a Personal Area Network (PAN) 206, a Wireless Local Area Network (WLAN), a Wireless Wide Area Network (WWAN) 226, a satellite 270 network, the public switched telephone network (PSTN) 228, and a Wide Area Network (WAN) 230, such as the Internet, or a combination thereof. In certain embodiments, the LAN 224 may be based upon one or more protocols, such as Ethernet, Asynchronous Transfer Mode (ATM), Token Ring, or Fiber Distributed Data Interface (FDDI). In certain embodiments, the PAN may be based upon one or more protocols commonly associated with Bluetooth, ZigBee, or ultrawideband (UWB). In certain embodiments, the WLAN may be based upon one or more variants of the IEEE 802.11 wireless communication standard. In certain embodiments, the WWAN 226 may be based upon one or more generations of known cellular network protocols, commonly referred to as 3G, 4G, 5G, and so forth. In certain embodiments, the WAN 230 may be based upon one or more protocols, such as X.25, Frame Relay, Asynchronous Transfer Mode (ATM), or Telecommunications Protocol/Internet Protocol (TCP/IP).

In certain embodiments, the user device 204 may be implemented with communication hardware and software that allows it to communicate with one or more wirelessly-enabled input/output (I/O) devices via a PAN 206 network link. Examples of such wirelessly-enabled I/O devices include a keyboard 208, a mouse 210, a game controller 212, earphones or earbuds 214, a headset 216, and so forth. Skilled practitioners of the art will be familiar with a network link, which as commonly used, refers to the physical and logical network component used to interconnect hosts or nodes in a network. Those of skill in the art will likewise be aware that such network links are generally established through the link layer of a telecommunications protocol stack, such as the Internet protocol suite or the Open Systems Interconnection (OSI) model. As typically implemented, the link layer refers to a group of methods and communications protocols confined to the network link that a host, such as a particular user device 204 is physically connected to.

In certain embodiments, the user device 204 may be implemented with communication hardware and software that allows it to communicate with one or more access points 234 via a PAN 244 network link, or a WLAN 244 network link, or both. Skilled practitioners of the art will be familiar with a wireless access point (AP) 234, which generally refers to a networking hardware device that allows a wirelessly-enabled device, such as a particular user device 204, to connect to a wired network, such as a LAN 224. In various embodiments, the AP 234 may be implemented as a standalone device. In certain of these embodiments, the AP 234 may be implemented to connect to a router 232 through a LAN 224. In certain embodiments, the functionality of an AP 234 may be implemented as an integral component of the router 232.

In certain embodiments, the user device 204 may be implemented with communication hardware and software that allows it to communicate with one or more peripherals 236 via a PAN 246 network link, a LAN 248 network link, or a WLAN 250 network link, or a combination thereof. In certain embodiments, the user device 204 may be implemented with communication hardware and software that allows it to communicate with one or more routers 232 via a LAN 240 network link, or a WLAN 238 network link, or both. In certain embodiments, the user device 204 may be implemented with communication hardware and software that allows it to communicate with one or more WWAN 226 cellular towers 260 via a WWAN 262 network link. In certain embodiments, the user device 204 may be implemented with communication hardware and software that allows it to communicate with one or more satellites 270 via a satellite 276 network link.

In various embodiments, a particular cellular tower 260, or a particular satellite 270, or a combination of the two, may be implemented, individually or in combination, to provide certain location data 278, familiar to those of skill in the art, to the user device 204. In certain embodiments, the user device 204 may be configured to receive such location data 278, which is used as a data source for determining the user device's 204 location '1' 220 through 'n' 222. In certain embodiments, the location data 278 may include Global Position System (GPS) data provided by a GPS satellite 270. In certain embodiments (not shown), the location data 278 may include various Internet Protocol (IP) or other network address information assigned to the user device 204. In certain embodiments (not shown), the location data 278 may likewise be provided by a router 232, or an AP 234, or both.

In certain embodiments, one or more satellites 270 may be implemented to use known satellite communication protocols to establish a satellite network link 274 to a base station 272. In various embodiments, the base station 272 may in turn be implemented to be connected to the PSTN 228, which in certain embodiments may likewise be implemented to be connected to one or more WWANs 230, or one or more WANs 230, or a combination thereof. In various embodiments, one or more LANs 224 may be implemented to be connected to one or more WANs 230, or a combination thereof. In certain of these embodiments, one or more routers 232, may be implemented, individually or in combination, to connect a particular LAN 224 to a particular WAN 230.

In various embodiments, the intelligent connectivity system 118 may be implemented to establish a particular network link 206, 238, 240, 242, 244, 246, 248, 250, 262, 276, as the user device 204 moves from location '1' 220 to location 'n' 222. In certain of these embodiments, the establishment of a particular network link 206, 238, 240, 242, 244, 246, 248, 250, 262, 276, may be based upon the availability of connectivity to a corresponding network. In various embodiments, the intelligent connectivity system 118 may be implemented to switch from one network link 206, 238, 240, 242, 244, 246, 248, 250, 262, 276 to another. In certain of these embodiments, such switching may be based upon the respective signal strength, available bandwidth, network latency, or a combination thereof, associated with the availability of connectivity to a corresponding network.

In certain embodiments, the intelligent connectivity system 118 may be implemented to switch from one network link 206, 238, 240, 242, 244, 246, 248, 250, 262, 276 to another according to the user device 204 being present at a particular location '1' 220 through 'n' 222. In various embodiments, the intelligent connectivity system 118 may be implemented to establish two or more simultaneous network links 206, 238, 240, 242, 244, 246, 248, 250, 262, 276. In certain of these embodiments, bandwidth respectively corresponding to the two or more network links 206, 238, 240, 242, 244, 246, 248, 250, 262, 276, may be combined to provide aggregated network link bandwidth for use by the user device.

In various embodiments, the intelligent connectivity system 118 may be implemented to assign network connectivity corresponding to a particular software application, or a user device 204 process, to a particular network link 206, 238, 240, 242, 244, 246, 248, 250, 262, 276. In certain embodiments, the intelligent connectivity system 118 may be implemented to respectively assign two or more software applications, or user device 204 processes, to two or more network links 206, 238, 240, 242, 244, 246, 248, 250, 262, 276, according to their corresponding attributes. For example, the intelligent connectivity system 118 may be implemented to assign a wireless-enabled gaming controller 212 to a PAN 206 link, while information generated and received by a game executing on the user device 204 may be assigned to WLAN 238 network link.

In certain of these embodiments, the respective assignment of two or more software applications, or user device 204 processes, or a combination thereof, to two or more network links 206, 238, 240, 242, 244, 246, 248, 250, 262, 276, may be according to the user device 204 being present at a particular location '1' 220 through 'n' 222. As an example, only a lower-speed (e.g., 300 Mbps) WLAN 238 network link may be available at location '1' 220, but both a high-speed (e.g., 100 Gbps) LAN 240 network link and a higher-speed (e.g., 1.7 Gbps) WLAN 238 network link may be available at location 'n' 222. In this example, the user 202 may wish to play a particular online game while simultaneously conducting an online chat session, whether they are at location '1' 220 or 'n' 222. To continue the example, it is possible that the bandwidth of the WLAN 238 network link at location '1' 220 may be barely adequate to support the network connectivity needs of the on-line game. As a result, the additional overhead of network traffic associated with the online chat session may result in the game not performing as responsively as desired.

However, the intelligent connectivity system 118 may be implemented to respectively assign the online chat session to the higher-speed WLAN 238 network link and the online game to the high-speed LAN 240 network link available at location 'n' 222. Accordingly, responsiveness of the online game will likely be improved due to the 100 Gbps speed provided by the LAN 238 network link available at location 'n' 220, while the online chat session will be adequately supported by the 1.7 Gbps speed of the WLAN 240 network link. Skilled practitioners of the art will recognize that many such embodiments and examples are possible. Accordingly, the foregoing is not intended to limit the spirit, scope or intent of the invention.

In certain embodiments, the intelligent connectivity system 118 may be implemented to establish and manage one or more virtual private network (VPN) connections on one or more corresponding network links. Skilled practitioners of the art will be familiar with a VPN, which as typically implemented, uses known tunneling protocols to extend a private network, such as a private LAN 224, across a public WAN 230, such as the Internet, to enable users 202 to use their user devices 204 to send and receive data as to and from an external resource, such as a remote server, as if it was directly connected to the private network. Certain embodiments of the invention reflect an appreciation that a single VPN may not always be sufficient for a particular operational mode, described in greater detail herein.

Accordingly, in certain embodiments, the intelligent connectivity system 118 may likewise be implemented to perform a multi-link network traffic routing operation. As used herein, a multi-link traffic routing operation broadly refers to any operation performed to route network traffic across two or more network links, as described in greater detail herein. In various embodiments, as described in greater detail herein, a multi-link traffic operation may be performed to perform a many-to-many mapping of a plurality of VPN connection to a corresponding plurality of network links. In certain of these embodiments, the many-to-many mapping may be optimized for a particular multi-link configuration. As used herein, as it relates to a many-to-many mapping of a plurality of VPN connection to a corresponding plurality of network links, optimized broadly refers to using certain network link attributes (e.g., available bandwidth, congestion, latency, signal strength, supported protocols, etc.) to determine which network link is best suited for the assignment of a particular VPN.

In certain embodiments, multi-link traffic operations are begun by identifying simultaneously operating VPNs. In various embodiments, the intelligent connectivity system 118 may be implemented to perform certain operations to identify such simultaneously operating VPNs. The configuration policy respectively associated with each identified VPN is then determined. In various embodiments, the configuration policy may be implemented to contain certain information associated with the type of network link supported, the type of traffic that may be routed by each, and so forth, for each VPN.

A network filter driver (NFD), described in greater detail herein, is then used to create n+1 first-in, first-out (FIFO) network traffic queues, where 'n' is defined as the number of previously identified VPNs. Thereafter, a network tunnel indication is created for each identified VPN when it is initiated. In certain embodiments, the network tunnel indication may be implemented as a network tunnel pointer, familiar to those of skill in the art. As an example, network tunnel pointers '1' and '2' may be respectively generated for VPNs '1' and '2.'

Thereafter, each VPN's associated configuration policy is communicated to the NFD. In certain embodiments, the VPN's associated configuration policy may be implemented to define which networks do not require the use of a VPN. In certain embodiments, the VPN's associated configuration policy may be implemented to define which type of network link (e.g., WLAN, WWAN 226, etc.) is supported for the VPN. In certain embodiments, the configuration policy may be implemented to define what kind of network traffic is allowed to be routed to which VPN. In certain embodiments each VPN's associated configuration policy may be implemented to create a list of available VPNs and their associated available network links. Those of skill in the art will recognize that many such embodiments of the use of such a configuration policy are possible. Accordingly, the foregoing is not intended to limit the spirit, scope, or intent of the invention.

Thereafter, a request from the user device's 204 operating system (OS) may be received by the intelligent connectivity system 118 to assign, or reassign, existing network traffic queues to the previously-identified VPNs. To continue the prior example, network traffic queue '1'→network tunnel '1', network traffic queue '2'→network tunnel '1', and network traffic queue '3'→no network tunnel for non-VPN network traffic. If such a request is received, a determination is then made whether a new network traffic queue is needed. If so, then a new network traffic queue is generated and mapped to an associated network tunnel. Thereafter, or if it was previously determined that a new network traffic queue was not needed, then each available network traffic queue is mapped to an available network link, followed by the establishment of a corresponding new VPN.

Figure 3:
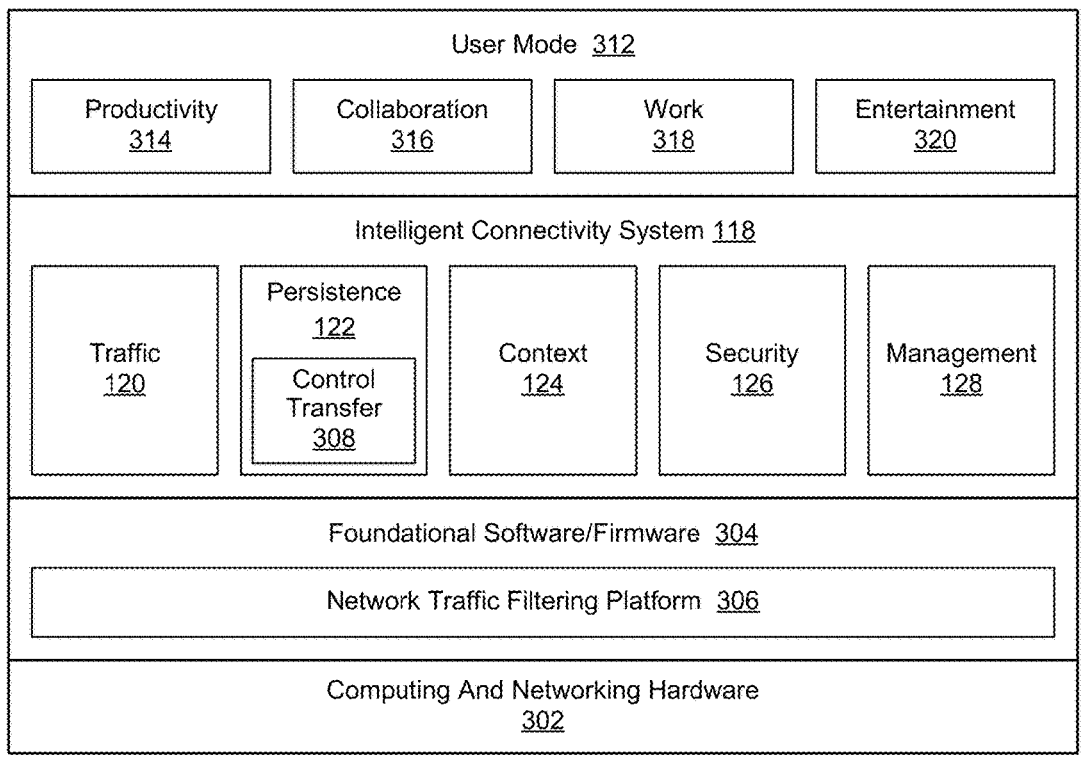
FIG. 3 shows a simplified block diagram of an intelligent connectivity framework.

FIG. 3 shows a simplified block diagram of an intelligent connectivity framework implemented in accordance with an embodiment of the invention. In various embodiments, the intelligent connectivity framework 300 may be implemented to include certain computing and communication hardware 302, certain foundational software and firmware 304, an intelligent connectivity system 118, and one or more operational modes 312, or a combination thereof. In certain embodiments, the computing and communications hardware 302, and the foundational software and firmware 304, or a combination thereof, may be implemented on a user device, described in greater detail herein.

In various embodiments, certain foundational software and firmware 304 may be implemented with certain computing and communication hardware 302, as described in greater detail herein, to detect the availability of connectivity to a particular network. In various embodiments, certain foundational software and firmware 304 may likewise be implemented with certain computing and communication hardware 302 to establish a network link to a detected network, as likewise described in greater detail herein, to communicate information. In certain embodiments, the information may be communicated over one or more virtual private network (VPN) connections. In certain embodiments, the foundational software and firmware 304 may be implemented to include a network traffic filtering platform 306. In certain embodiments, the network traffic filtering platform 306 may be implemented as a Windows® kernel mode filter driver.

In certain embodiments, the intelligent connectivity system 118 may be implemented to perform an intelligent connectivity operation. As used herein, an intelligent connectivity operation broadly refers to any operation whose performance improves a user device's ability to utilize, as described in greater detail herein, network connectivity that may be available for provision by one or more networks. In various embodiments, the intelligent connectivity system 118 may be implemented to use certain computing and communication hardware 302 and certain foundational software and firmware 304, individually or in combination, to perform a particular intelligent connectivity operation.

In certain embodiments, the intelligent connectivity system 118 may be implemented to include a traffic component 120, a persistence component 122, a context component 124, a security component 126, and a management component 128, or a combination thereof. In certain embodiments, the traffic component 120, persistence component 122, context component 124, security component 126, or management component 128 may be implemented, individually or in combination, to perform a particular intelligent connectivity operation. In certain embodiments, the traffic component 120 may be implemented to determine whether one or more networks are available to provide network connectivity to the information handling system 100. In certain embodiments, the traffic component 120 may be implemented to use the one or more networks, individually or in combination, to provide network connectivity to a user device.

In certain embodiments, the persistence component 122 may be implemented to use two or more networks, individually or in combination, to provide network connectivity continuity to a user device. In certain embodiments, the persistence components 122 may be implemented to include a control transfer sub-component 308. In certain embodiments, the control transfer sub-component 308 may be implemented, as described in greater detail herein, to perform a control transfer operation.

As used herein, a control transfer operation broadly refers to any operation performed to transfer the control of an application executing on one network-enabled user device to another network-enabled user device. In certain embodiments, a control transfer operation may be implemented to seamlessly transfer an application executing on a first network-enabled user device to a second network-enabled user device, and once it is executing on the second network-enabled user device, enable its control from the second network-enabled user device. In certain embodiments, the transfer of control may occur according to the proximity of one network-enabled device to another, one or more user gestures, or a combination thereof.

In certain embodiments, the context component 124 may be implemented to select one or more networks to provide network connectivity to a user device based upon the context in which the user device is being used. In certain embodiments, the security component 126 may be implemented to select one or more networks to provide secure network connectivity to a user device. In various embodiments, the management component 128 may be implemented to manage certain aspects of network connectivity provided by one or more networks to a user device.

In various embodiments, the intelligent connectivity system 118 may be implemented to provide certain network connectivity, at a particular time, or location, or both, to a user device according to its current operational mode 312. As used herein, an operational mode 312 of a user device broadly refers to the purpose it may be used for. In certain embodiments, the operational mode 312 of a user device may be associated with the use of a particular user device for productivity 314, collaboration 316, work 318, or entertainment 320, or a combination thereof.

As used herein, and as it relates to an operational mode 312, productivity 314 broadly refers to the ratio of output volume to input volume. For example, a consultant for a construction company may need to estimate the cost of a project while at a client's jobsite. In this example, the consultant may enter certain information related to the project, such as the amount and cost of certain materials and anticipated labor costs, into a project estimation application running on a mobile user device. To continue the example, the estimator may achieve a certain level of productivity 314 by simply using the project estimation application to generate an initial estimate.

However, the consultant may achieve a greater level of productivity 314 if the user device is able to use available network connectivity to establish two virtual private network (VPN) connections, one to the consultant's resources and another to the client's resources. If so, then the consultant can use the first VPN connection to securely access past estimates for similar projects, which in turn can be used to prepare a final estimate for the client. Once the final estimate is completed, the second VPN connection can be used to present it to the client.

As used herein, and as it relates to an operational mode 312, collaboration 316 broadly refers to the action of interacting with someone to achieve a common purpose. Skilled practitioners of the art will recognize that many examples of such a common purpose are possible. As an example, the common purpose may be for a group of individuals with a common interest to use their respective user devices to participate in a videoconference to produce or create something. As another example, the common purpose may be for a group of friends to use their respective user devices to meet via videoconference on a regular basis to maintain their relationship.

As used herein, and as it relates to an operational mode 312, work 318 broadly refers to an exertion or effort to produce or accomplish something. Those of skill in the art will be aware that work may take many forms. As an example, an exterminator may be paid by the job. In this example, the exterminator may stop in a coffee shop, access their public WiFi network, and establish a VPN connection to his office. Once connected, the exterminator may securely download his assignments for the day. Then, one by one, he continues on to each location and completes his assignment. To continue the example, after completion of each assignment the exterminator may then complete a report. Once it is complete, the exterminator may then access a cellular network, establish a VPN connection, and then securely upload each report to his office.

Certain embodiments of the invention reflect an appreciation that not all work 318 is performed for monetary reward. For example, some work 318 may be performed for educational purposes. To illustrate this example, a student may use a mobile user device, no matter where they may be, to access knowledge resources through a network connection, use those resources to complete an assignment, and then submit it using the same, or a different, network connection.

As another example, some work 318 may be performed for altruistic reasons. To illustrate this example, a member of a non-profit organization may volunteer to check on the wellbeing of elderly residents. In this example, the volunteer may use the WiFi connection in her home to establish a VPN connection with the non-profit. Once the VPN connection is established, she downloads the list of residents, and their addresses, she is scheduled to visit that day to her tablet computer. She then uses the tablet computer throughout the morning to note the status of each resident. The volunteer then stops at a restaurant for lunch. Once she has ordered, she accesses the WiFi network connection in the restaurant, establishes a VPN connection with the non-profit, and uploads a report summarizing the results of her morning's work.

As used herein, and as it relates to an operational mode 312, entertainment 320 broadly refers to the action of providing, or being provided, with amusement or enjoyment. Skilled practitioners of the art will recognize that entertainment may take many forms. As an example, a user may use a mobile device to wirelessly connect to a Local Area Network (LAN) in their home. Once the connection is established, the user may access a streaming movie service. Once the streaming movie service is accessed, and a movie selected, the user may then use a Bluetooth connection to wirelessly connect a pair of earphones to their mobile device. Once connected, the user can then view the movie on the mobile device as they listen to the movie's soundtrack on their wireless headphones.

As another example, a user may use a gaming computer to play an online, multi-user game. In this example, the user may use a wired connection to the LAN in their home for the gaming computer and a cellular network connection for their mobile phone. To continue the example, the gaming computer may use the wired connection to the LAN to ensure that whatever bandwidth is available on the LAN is dedicated to the online game itself. Likewise, the user may use the mobile phone's connection to the cellular network to carry on a conversation with other players of the online game.

Certain embodiments of the invention reflect that it is possible that a particular operational mode 312 may be associated with the simultaneous use of a particular user device for productivity 314, collaboration 316, work 318, or entertainment 320, or a combination thereof. As an example, a game developer may use a user device, in combination with one or more network connections, while developing a game. In this example, the developer may use the user device, and the one or more network connections to improve their productivity 314, collaborate 316 with co-workers, work 318 on various aspects of the game, all the while being entertained 320 by the game itself. Those of skill in the art will recognize that many such examples of an operational mode 312 are possible. Accordingly, the foregoing is not intended to limit the spirit, scope, or intent of the invention.

Figure 4:
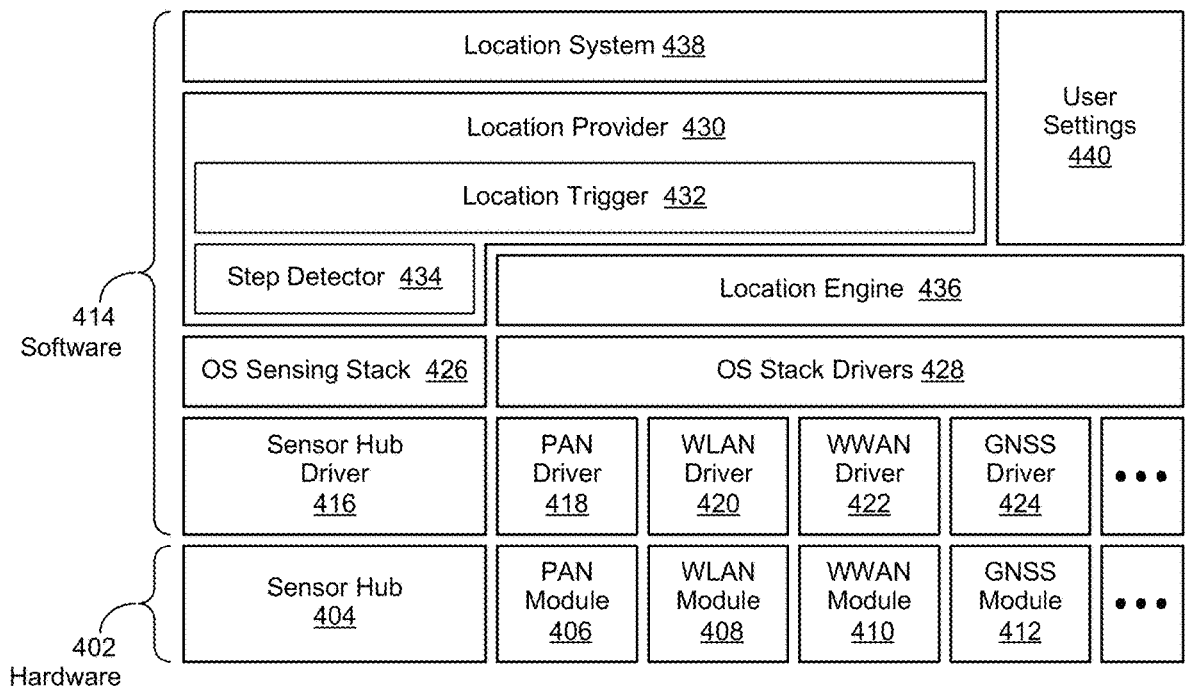
FIG. 4 shows hardware and software components used in the performance of a Bluetooth network connectivity persistence operation.

FIG. 4 shows hardware and software components used in the performance of a Bluetooth network connectivity persistence operation implemented in accordance with an embodiment of the invention. In various embodiments, a user device may be implemented with certain hardware 402 and software 414 components that it may use to determine its location and the location of certain network links, described in greater detail herein. In certain embodiments, the hardware components 402 may include a location sensor hub 404 module, a Personal Area Network (PAN) 406 module, a Wireless Local Area Network (WLAN) 408 module, a Wireless Wide Area Network (WWAN) 410 module, a Global Navigation Satellite System (GNSS) 412 module, and so forth.

As used herein, a sensor hub 404 module broadly refers to a hardware module configured to integrate sensor data from different sensors and process them. In certain embodiments, the sensor hub 404 module may be implemented to off-load sensor-related operations and processes from a user device's primary central processing unit (CPU) to reduce battery consumption and provide associated performance improvements. One known example of a sensor hub 404 module is the INTEL® Integrated Sensor Hub (ISH).

In certain embodiments, the PAN 406 module may be implemented to communicate data through a network link to an associated PAN, described in greater detail herein. In certain embodiments, the WLAN 408 module may be implemented to communicate data through a network link to an associated WLAN, likewise described in greater detail herein. Likewise, as described in greater detail herein, the WWAN 410 module may be implemented in certain embodiments to communicate data through a network link to an associated WWAN. In various embodiments, as likewise described in greater detail herein, the GNSS 412 module may be implemented to receive certain Global Position System (GPS) data from a GPS satellite.

In certain embodiments, the software components 414 may include a sensor hub 416 driver, a PAN 418 driver, a WLAN 420 driver, a WWAN 422 driver, a GNSS 424 driver and so forth. In certain embodiments, the sensor hub 416, PAN 418, WLAN 420, WWAN 422, and GNSS 424 drivers may be implemented to respectively provide a programming interface to control and manage the sensor hub 404, PAN 406, WLAN 408, WWAN 410, and GNSS 412 modules. In certain embodiments, the software components 414 may likewise include an operating system (OS) sensing stack 426 and OS stack drivers 428 familiar to skilled practitioners of the art.

Likewise, in certain embodiments, the software components 414 may include a location engine 436. In certain embodiments, the location engine 436 may be implemented to perform a location determination operation. As used herein, a location determination operation broadly refers to any operation performed to determine the location of a user device, and the location of an available network, and the distance between the two.

In certain embodiments, the software components 414 may likewise include a location provider 430 module. In certain embodiments, the location provider 430 module may be implemented to include a location trigger 432 sub-module, or a step detector 434 sub-module, or both. In various embodiments, the location trigger 432 sub-module may be implemented to perform a geofencing operation. As used herein, a geofencing operation broadly refers to any operation performed to establish a virtual perimeter, commonly referred to as a geo-fence, for a corresponding real-world geographic area.

In certain embodiments, a geo-fence may be dynamically generated, such as a radius around a particular geographic point. In certain embodiments, a geo-fence may be generated as a set of predefined geographic boundaries. In certain embodiments, the location trigger 432 sub-module may be implemented to generate an alert when an associated user device approaches the boundaries of a particular geo-fence. In certain embodiments, the step detector 434 sub-module may be implemented to measure individual steps a user may make in the course of using a particular user device. In various embodiments, the step detector 434 sub-module may be implemented to use certain information provided by a motion sensor, or accelerometer, or both, to make such user step measurements.

In various embodiments, the location trigger 432 sub-module and the step detector 434 sub-module may be implemented, individually or in combination, to provide certain location information they may generate to the location provider 430 module. In various embodiments, the location provider 430 module may be implemented to generate location information for use by software applications executing on a user device. In certain embodiments, the location provider 430 module may be implemented to determine the geographic location of an associated user device by WLAN triangulation, use of location information provided through the use of the IEEE 802.11mc standard, IP address resolution, cellular network tower triangulation, use of Global Position System (GPS) information, or a combination thereof. In various embodiments, the location provider 430 module may be implemented to use certain location information provided by the location trigger 432 and step detector 434 sub-modules to provide location information for use in a location network tag (LNT), described in greater detail herein. One known example of a location provider 430 module is the WINDOWS® LOCATION PROVIDER®, familiar to those of skill in the art.

In certain embodiments, the software components 414 may include a location system 436. In various embodiments, the location system 436 may be implemented to use certain known artificial intelligence (AI) and machine learning (ML) approaches to estimate a particular network link's expected throughput, latency, coverage, signal strength, and other network connectivity metrics. In various embodiments, the location system 436 may be implemented to certain location information provided by the location provider 430, or LNT information it may generate, in the use of such AI and ML approaches.

In certain embodiments, the software components 414 may likewise include a user settings 440 module. In certain embodiments, the user settings 440 module may be implemented to store certain network connectivity settings associated with a user of a user device. Skilled practitioners of the art will recognize that many such embodiments are possible. Accordingly, the foregoing is not intended to limit the spirit, scope, or intent of the invention.

FIG. 5 show integration of Bluetooth Low Energy (LE) High Accuracy Distance Measurement (HADM) physical links and channels into a Bluetooth protocol architecture implemented in accordance with an embodiment of the invention. In certain embodiments, a Bluetooth LE HADM physical channel 524 and a Bluetooth LE HADM physical link 526 may be respectively implemented to be integrated into a corresponding Bluetooth protocol architecture 500. As shown in FIG. 5, the Bluetooth protocol architecture 500 may include a physical transport layer 502, which corresponds to a Bluetooth LE physical transport layer 522. As likewise shown in FIG. 5, the Bluetooth protocol architecture 500 may include a physical channel 504 layer and a physical link 506 layer. In certain embodiments, a Bluetooth LE HADM physical channel 524 and a Bluetooth LE HADM physical link 526 may respectively be implemented to correspond to the physical channel 504 and physical link 506 layers of the Bluetooth protocol architecture 500.

Likewise, as shown in FIG. 5, the Bluetooth protocol architecture 500 may include a logical transport 508 layer, a logical link 512 layer, a channels 514 layer, and an application 516 layer. As typically implemented, the channels 514 layer of the Bluetooth protocol architecture 500 may include a logical link control and adaption protocol (L2CAP) layer and an Isochronous Adaption Layer (ISOAL) channel, both of which will be familiar to skilled practitioners of the art. In certain embodiments, a control transfer component 308, described in greater detail herein, may be implemented to correspond to the application layer 516 of the Bluetooth architecture 500.

FIG. 6 shows modes of operation used in the performance of a control transfer operation implemented in accordance with an embodiment of the invention. In certain embodiments, a control transfer operation, described in greater detail herein, may be performed to transfer control 650 of an application executing on one network-enabled device, such as user device '1' 612, to another network-enabled device, such as user device '2' 622. In certain embodiments, as described in greater detail herein, the transfer of control 650 may be initiated may be initiated as a result of the proximity of two network-enabled devices to one another, or the performance of one or more user gestures, or a combination thereof.

In certain embodiments, a control transfer operation may be implemented to include a user mode 602 of operation and a kernel mode 604 of operation. Skilled practitioners of the art will be familiar with a user mode 602 of operation, which refers to when the operating system (OS) of an information handling system (IHS), such as user device '1' 612 and '2' 622, is running a user application such as a web browser, word processor, spreadsheet, and so forth. Those of skill in the art will likewise be aware that core OS components run in kernel mode 604. Likewise, drivers, such as Bluetooth Low Energy (LE) drivers '1' 618 and '2' 638, and services, such as High Accuracy Distance Measurement (HADM) services '1' 616 and '2' 636, typically run in kernel mode 604.

Likewise, as shown in FIG. 6, other OS components, such as Generic Attribute Profile (GATT) profiles '1' 620 and '2' 640, and Attribute Protocols (ATT) '1' 622 and '2' 643, typically run in kernel mode 604. Skilled practitioners of the art will be familiar with the concept of a GATT profile, which is a general specification for sending and receiving small pieces of data, commonly referred to as attributes, over a Bluetooth Low Energy (LE) network link. More particularly, a GATT profile, as typically implemented, is a specification for how a device, such as user devices '1' 612 and '2' 622, works when used for a particular application 630, such as an application 630 associated with a particular user device context, described in greater detail herein, control transfer components '1' 614 and '2' 634, and so forth. In certain embodiments, a particular device may be implemented with one or more GATT profiles. For example, a device may be implemented with a battery level detector and a network-enabled device proximity detector.

Those of skill in the art will likewise be aware that GATT profiles are built on top of an ATT, which as typically implemented provides certain uniquely identifiable device attribute information in a standardized 128 bit format with an associated string ID. These attributes are formatted as characteristics and services. An ATT characteristic, which can be thought of a type, analogous to a class, contains a single value and 0-n descriptors that describe the characteristic's value. An ATT descriptor is a defined ATT attribute that describe a characteristic value, such as an acceptable range for a particular characteristic's value, of an associated unit of measurement (e.g., decibels for signal strength, centimeters for device proximity distance, etc.). An ATT service is a collection of ATT characteristics, such as signal strength for a particular network link, distance between two network-work enabled user devices that are proximate to one another, and so forth.

In certain embodiments, as likewise shown in FIG. 6, the transfer of control 650 of a particular application 630 from user device '1' 612 to user device '2' 632 may be initiated by a user invoking the control transfer component '2' 634 implemented on user device '2' 632. In certain embodiments, the control transfer component '2' 634 may be invoked as a result of the proximity of user device '2' 632 to user device '1' 612, a one or more user gestures, or a combination thereof, as described in greater detail herein. In certain embodiments, the control transfer components '2' 634 and '1' 614 may be implemented to respectively use HADM services '2' 638 and '1' 616 to determine the proximity of user device '2' 632 to user device '1' 612, detect one or more user gestures, or a combination thereof. In certain embodiments, the control transfer components '2' 634 and '1' 614 may likewise be implemented to interact with the application 630 to transfer its control, as likewise described in greater detail herein from user device '1' 612 to user device '2' 632.

In certain embodiments, Bluetooth LE drivers '1' 618 and '2' 638 may respectively be implemented to interact with the application 630 and HADM services '1' 616 and '2' 636 to support the transfer of control 650 of the application 630 from user device '1' 612 to user device '2' 632. Likewise, in certain embodiments, Bluetooth LE drivers '1' 618 and '2' 638 may respectively be implemented to interact with GATT profiles '1' 620 and '2' 640, and ATTs '1' 622 and '2' 642 to determine which transfer of control 650 selections, described in greater detail herein, may be presented to a user. Those of skill in the art will recognize that many such embodiments are possible. Accordingly, the foregoing is not intended to limit the spirit, scope, or intent of the invention.

Figure 7A:
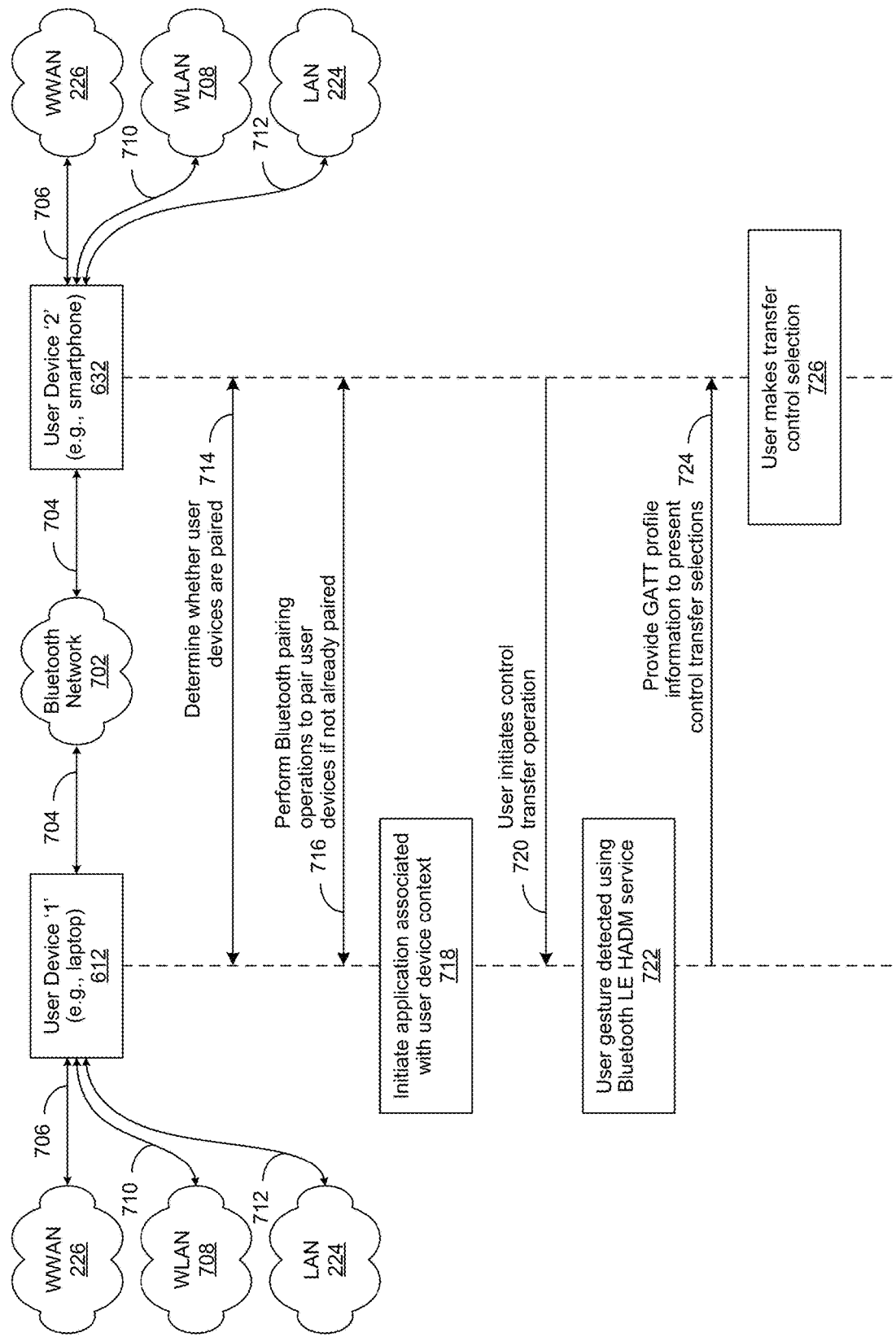
FIGS. 7*a* and 7*b* show process flows associated with the performance of a control transfer operation.
Figure 7B:
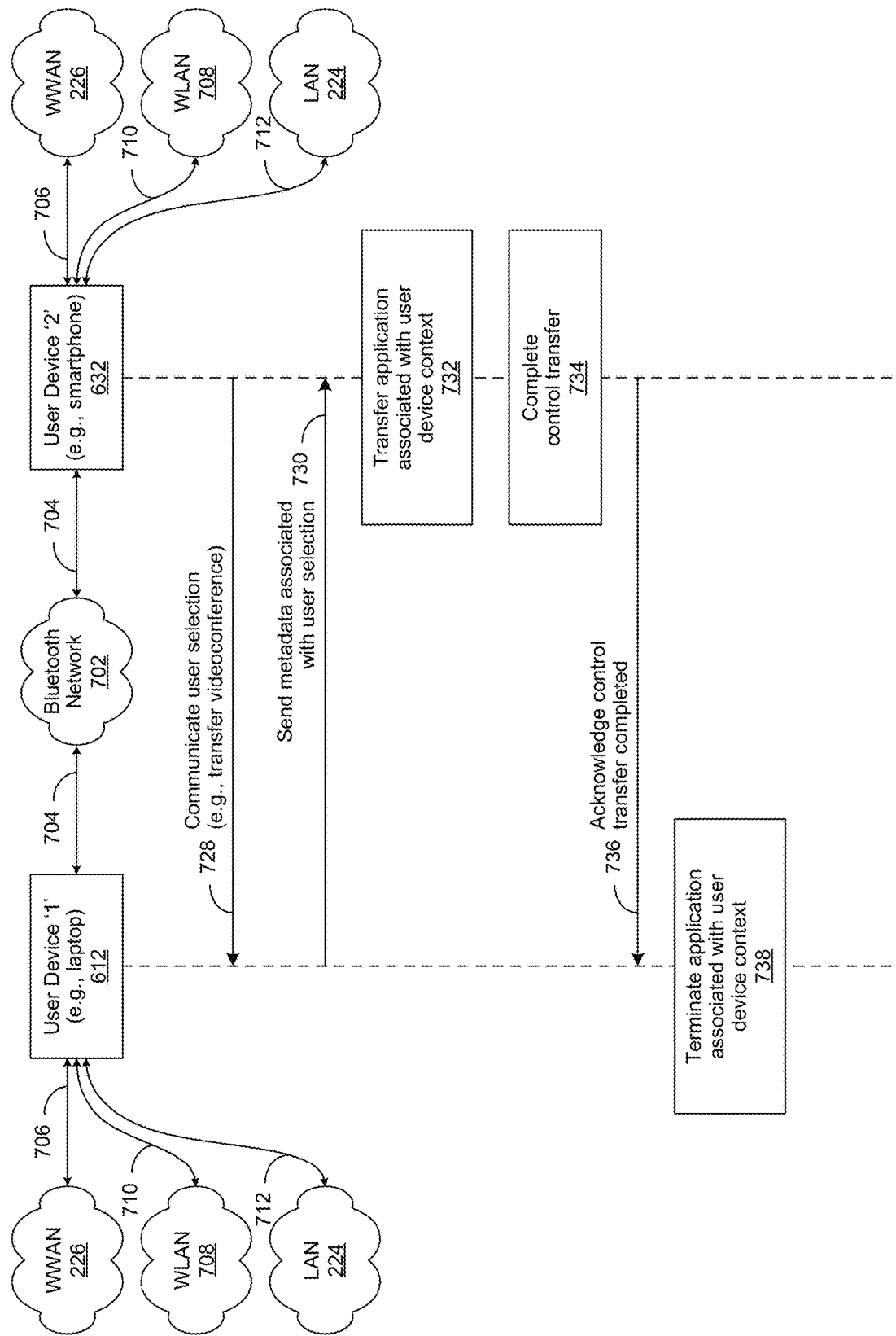

FIGS. 7a and 7b show process flows associated with the performance of a control transfer operation implemented in accordance with an embodiment of the invention. In this embodiment, user devices '1' 612, such as a laptop computer, and '2' 622, such as a smartphone, are both network-enabled. More particularly, as shown in FIGS. 7a and 7b, user devices '1' 612 and '2' 632 may be implemented to respectively use a network link 702 to establish a Bluetooth network 702 connection with one another. As described in greater detail herein, user devices '1' 612 and '2' 632 may be implemented use the Bluetooth network 702 connection in the performance of certain control transfer operations, likewise described in greater detail herein.

As likewise shown in FIGS. 7a and 7b, user devices '1' 612 and '2' 632 may be implemented to respectively use network links 706, 710, and 712 to establish a network connection with a Wireless Wide Area Network (WWAN) 226, a Wireless Local Area Network (WLAN) 708, or a Local Area Network (LAN) 224, or a combination thereof. In certain embodiments, user devices '1' 612 and '2' 632 may be implemented to use network links 706, 710, and 712 to establish a network connection to the same WWAN 226, WLAN 708, or LAN 224, or different WWANs 226, WLANs 708, or LANs 224, or a combination thereof. In certain embodiments, user devices '1' 612 and '632' may be implemented to respectively use a connection to a WWAN 226, WLAN 708, or LAN 224 to execute one or more applications associated with a particular user device context, described in greater detail herein.

In this embodiment, either user device '1' 612 or '2' 632 may be implemented in step 714 to use their respective network connection to the Bluetooth network 702 to determine whether or not they are they have a Bluetooth paired relationship when in proximity of each another. If not, then Bluetooth pairing operations familiar to skilled practitioners of the art are performed in step 716 to pair user devices '1' 612 and '2' 632 to one another. In certain embodiments, the Bluetooth pairing operations may be initiated by either user device '1' 612 or '2' 632.

User device '1' 612 is then used in step 718 to initiate an application (e.g., a videoconferencing application) associated with a particular user device context, such as a video-conferencing session conducted for collaboration. Then, in step 720, the user device '2' 632 is used by a user to initiate a control transfer operation, likewise described in greater detail herein. In certain embodiments, as likewise described in greater detail herein, the control transfer operation may be initiated as a result of the proximity of network-enabled user devices '1' 612 and '2' 622 to one another, or the performance of one or more user gestures, or a combination thereof.

In various embodiments, certain features of the Bluetooth Low Energy (LE) High Accuracy Distance Measurement (HADM) service may be used in step 722 to determine the proximity of user devices '1' 612 and '2' 622 to one another, or the performance of one or more user gestures, or a combination thereof. As an example, the user may hold the device '2' 622 (e.g., a smartphone) within a certain proximity distance (e.g., six inches) of the user device '1' 612 (e.g., a laptop computer), and make a left-to-right swiping motion. In this example, the proximity of the user devices '1' 612 and '2' 622, combined with the user gesture of making a left-to-right swiping motion with the user device '2' 622, initiates the transfer control operation. In various embodiments, the actual distance between the user devices '1' 612 and '2' 622 that are proximate to one another, and the particular user gesture used to initiate a transfer control operation, is a matter of design choice.

Certain Generic Attribute Profile (GATT) profile information, described in greater detail herein, is then provided by the network-enabled user device '1' 612 in step 724 to the network-enabled user device '2' 632, where it is then used to determine which control transfer selections are available to present to the user. As an example, the GATT profile information provided by the user device '1' 612, may be used by the user device '2' 622 to present transfer control selections of "transfer videoconference to smartphone," "mute microphone," and "audio only," or a combination thereof, to the user. Those of skill in the art will recognize that many such examples of using GATT profile information to determine which transfer control selections to present to a user are possible. Accordingly, the foregoing is not intended to limit the spirit, scope, or intent of the invention.

The user then makes their transfer control selections in step 726, and once selected, they are then transferred to the user device '1' 612. The transfer control selection (e.g., "transfer videoconference to smartphone—audio only") made by the user in step 726 is then communicated to user device '1' 612 in step 728. In response, user device '1' 612 securely communicates certain metadata (e.g., account number, user ID, password, videoconference session number, user preferences, etc.) associated with the currently executing application (e.g., a videoconferencing session) to the user device '2' 622 in step 730. The transferred metadata is then used by the user device '2' 622 in step 732 to initiate the application currently executing on the user device '1' 612 and transfer its control to itself.

Once the application currently executing on the user device '1' 612 is executing on the user device '2', transfer of its control to the user device '2' 622 is completed in step 734. In turn, the user device '2' 622 sends an acknowledgement (ACK) to the user device '1' 612 in step 736 that transfer of the currently executing application, and its control, has been completed. In response, the user device '1' 612 terminates the currently executing application in step 738.

Figure 8A:
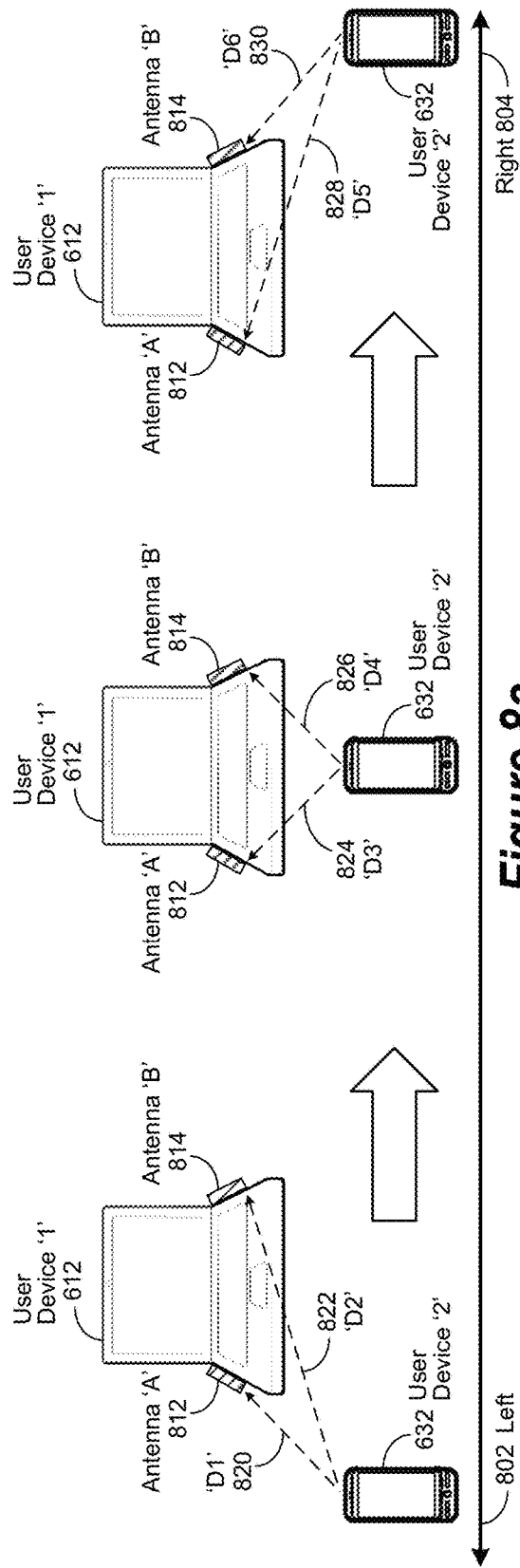
FIGS. 8*a* and 8*b* show the use of user device to perform a user gesture associated with a control transfer operation.
Figure 8B:
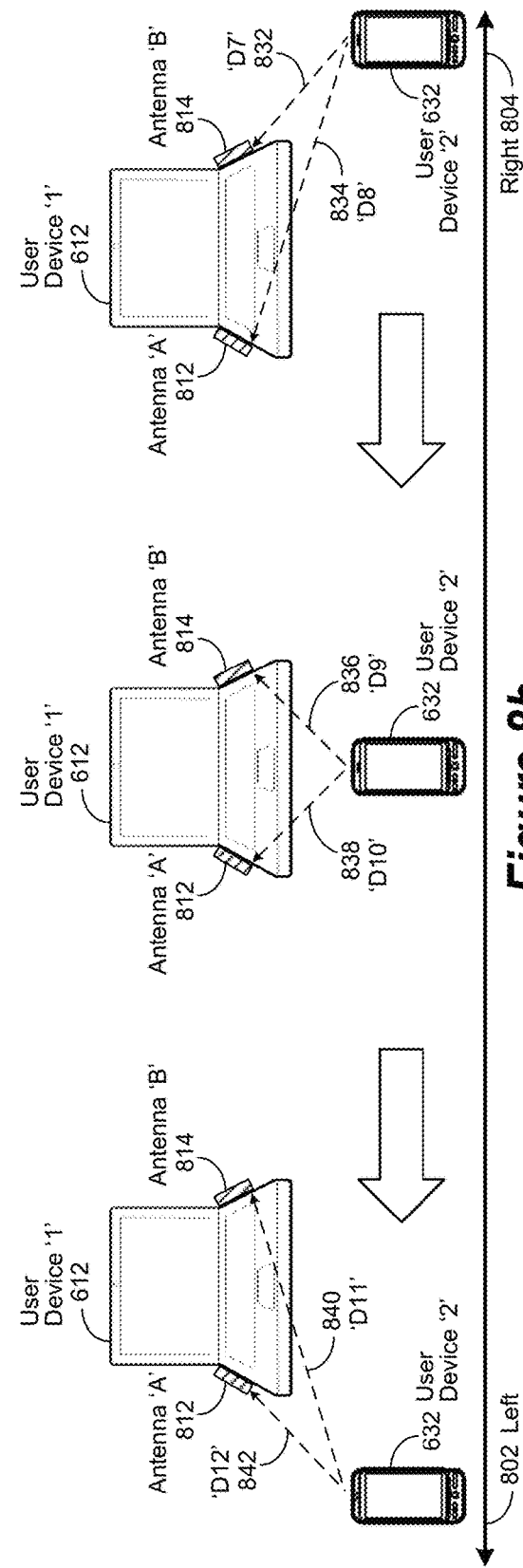

FIGS. 8a and 8b show the use of user device to perform a user gesture associated with a control transfer operation implemented in accordance with an embodiment of the invention. In certain embodiments, user device '1' 612 may be implemented with antennas 'A' 812 and 'B' 814. In certain embodiments, antennas 'A' 812 and 'B' 814 may be integrated within the physical confines of the user device '1' 612.

In these embodiments, the placement of antennas 'A' 812 and 'B' 814, the distance between them, and the method by which they are integrated within the physical confines of the user device '1' 612, is a matter of design choice. In certain embodiments, additional antennas, not shown, may be integrated within the physical confines of the user device '1' 612 to support additional user gestures, described in greater detail herein. In certain embodiments, the orientation of antennas 'A' 812 and 'B' 814, and additional antennas not shown in FIGS. 8a and 8b, may likewise be repositioned, or otherwise changed, to support different or additional user gestures.

In certain embodiments, user device '1' 612 and user device '2' 632 may both be implemented with High Accuracy Distance Measurement (HADM) capabilities, describe in greater detail herein. In certain embodiments, these HADM capabilities may be implemented to accurately determine the respective distance (e.g., within 20 centimeters or less) between user device '2' 632 and antennas 'A' 812 and 'B' 814. In certain embodiments, the respective distance between user device '2' 632 and antennas 'A' 812 and 'B' 814 may be used to determine the proximity of user devices '1' 612 and '2' 632 to one another, the occurrence of one or more user gestures, or a combination thereof.

As an example, as shown in FIG. 8a, the use of HADM by both user devices '1' 612 and '2' 632 may result in detecting that distance 'D1' 820 between user device '2' 632 and antenna 'A' 812 is less than distance 'D2' 822 between user device '2' 632 and antenna 'B' 814. Accordingly, it can be determined that user device '2' 632 is located to the left 802 of user device '1' 612. To continue the example, the use of HADM by both user devices '1' 612 and '2' 632 may result in detecting that distance 'D3' 824 between user device '2' 632 and antenna 'A' 812 is approximately the same as distance 'D4' 826 between user device '2' 632 and antenna 'B' 814. Accordingly, it can be determined that user device '2' 632 is located between the left 802 and the right 804 of user device '1' 612.

To continue the example further, the use of HADM by both user devices '1' 612 and '2' 632 may result in detecting that distance 'D5' 828 between user device '2' 632 and antenna 'A' 812 is greater than the distance 'D6' 830 between user device '2' 632 and antenna 'B' 814. Accordingly, it can be determined that user device '2' 632 is located to the right 804 of user device '1' 612. To continue the example even further, sequential HADM measurements of distances 'D1' 820, 'D2' 822, 'D3' 824, 'D4' 826, 'D5' 828, and 'D6' 830 over a certain period of time may result in the determination that user device '2' 632 is moving left 802 to right 804 relative to user device '1' 312, and as such, is being used to perform a user gesture. To further continue the example, such a user gesture may be used in certain embodiments to transfer control of an application executing on user device '1' 612 to user device '2' 632.

As another example, as shown in FIG. 8b, the use of HADM by both user devices '1' 612 and '2' 632 may result in detecting that distance 'D7' 832 between user device '2' 632 and antenna 'B' 814 is less than distance 'D8' 834 between user device '2' 632 and antenna 'A' 812. Accordingly, it can be determined that user device '2' 632 is located to the right 804 of user device '1' 612. To continue the example, the use of HADM by both user devices '1' 612 and '2' 632 may result in detecting that distance 'D9' 836 between user device '2' 632 and antenna 'B' 814 is approximately the same as distance 'D10' 838 between user device '2' 632 and antenna 'A' 812. Accordingly, it can be determined that user device '2' 632 is located between the right 804 and the left 802 of user device '1' 612.

To continue the example further, the use of HADM by both user devices '1' 612 and '2' 632 may result in detecting that distance 'D11' 840 between user device '2' 632 and antenna 'B' 814 is greater than the distance 'D12' 842 between user device '2' 632 and antenna 'A' 812. Accordingly, it can be determined that user device '2' 632 is located to the left 804 of user device '1' 612. To continue the example even further, sequential HADM measurements of distances 'D7' 832, 'D8' 834, 'D9' 836, 'D10' 838, 'D11' 840, and 'D12' 842 over a certain period of time may result in the determination that user device '2' 632 is moving right 804 to left 802 relative to user device '1' 312, and as such, is being used to perform a user gesture. To further continue the example, such a user gesture may be used in certain embodiments to transfer control of an application executing on user device '2' 632 to user device '1' 612. Skilled practitioners of the art will recognize that many such embodiments and examples are possible. Accordingly, the foregoing is not intended to limit the spirit, scope, or intent of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as JAVA, SMALLTALK, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a control transfer operation, comprising:
   using a Bluetooth compatible phase based ranging to detect proximity between a first device and a second device, the first device executing a first application, the first application having an associated first application context;
   detecting a change in proximity between the first device and the second device via the phase based ranging;
   providing a notification to a user on the second device when the change in proximity is detected, the notification querying the user regarding whether to transfer operation of the first application from the first device to the second device; and,
   automatically providing the first application context to the second device based upon the querying.

2. The method of claim 1, wherein:
   the phase based ranging provides a High Accuracy Distance Measurement (HADM).

3. The method of claim 1, further comprising:
   initiating executing a version of the first application on the second device; and,
   transferring control of the first application to the version of the first application executing on the second device.

4. The method of claim 1, further comprising:
   determining when the first device and the second device have a Bluetooth paired relationship when the first device and the second device are in proximity of each other.

5. The method of claim 1, wherein:
   the first device comprises a plurality of antennas; and, the phase based ranging detects proximity of the second device to each of the plurality of antennas.

6. The method of claim 5, further comprising:
detecting a gesture of the second device relative to each of the plurality of antennas; and,
executing a predetermined operation in response to the gesture.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
using a Bluetooth compatible phase based ranging to detect proximity between a first device and a second device, the first device executing a first application, the first application having an associated first application context;
detecting a change in proximity between the first device and the second device via the phase based ranging;
providing a notification to a user on the second device when the change in proximity is detected, the notification querying the user regarding whether to transfer operation of the first application from the first device to the second device; and,
automatically providing the first application context to the second device based upon the querying.

8. The system of claim 7, wherein
the phase based ranging provides a High Accuracy Distance Measurement (HADM).

9. The system of claim 7, wherein the instructions executable by the processor are further configured for:
initiating executing a version of the first application on the second device; and,
transferring control of the first application to the version of the first application executing on the second device.

10. The system of claim 7, wherein the instructions executable by the processor are further configured for:
determining when the first device and the second device have a Bluetooth paired relationship when the first device and the second device are in proximity of each other.

11. The system of claim 7, wherein:
the first device comprises a plurality of antennas; and,
the phase based ranging detects proximity of the second device to each of the plurality of antennas.

12. The system of claim 11, wherein the instructions executable by the processor are further configured for:
detecting a gesture of the second device relative to each of the plurality of antennas; and,
executing a predetermined operation in response to the gesture.

13. A non-transitory, computer-readable storage medium embodying computer program code, the computer program code comprising computer executable instructions configured for:
using a Bluetooth compatible phase based ranging to detect proximity between a first device and a second device, the first device executing a first application, the first application having an associated first application context;
detecting a change in proximity between the first device and the second device via the phase based ranging;
providing a notification to a user on the second device when the change in proximity is detected, the notification querying the user regarding whether to transfer operation of the first application from the first device to the second device; and,
automatically providing the first application context to the second device based upon the querying.

14. The non-transitory, computer-readable storage medium of claim 13, wherein:
the phase based ranging provides a High Accuracy Distance Measurement (HADM).

15. The non-transitory, computer-readable storage medium of claim 13, wherein the computer executable instructions are further configured for:
initiating executing a version of the first application on the second device; and,
transferring control of the first application to the version of the first application executing on the second device.

16. The non-transitory, computer-readable storage medium of claim 13, wherein the computer executable instructions are further configured for:
determining when the first device and the second device have a Bluetooth paired relationship when the first device and the second device are in proximity of each other.

17. The non-transitory, computer-readable storage medium of claim 16, wherein:
the first device comprises a plurality of antennas; and,
the phase based ranging detects proximity of the second device to each of the plurality of antennas.

18. The non-transitory, computer-readable storage medium of claim 13, wherein the computer executable instructions are further configured for:
detecting a gesture of the second device relative to each of the plurality of antennas; and,
executing a predetermined operation in response to the gesture.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *